United States Patent [19]

Newcombe et al.

[11] Patent Number: 4,889,165
[45] Date of Patent: Dec. 26, 1989

[54] WATER SUPPLY VALVES

[75] Inventors: Haydn J. Newcombe, Wolverhampton; John Hird, West Yorkshire, both of England

[73] Assignee: Armitage Shanks Limited, Armitage, England

[21] Appl. No.: 241,107

[22] Filed: Sep. 2, 1988

[30] Foreign Application Priority Data

Sep. 9, 1987 [GB] United Kingdom ................ 8721145

[51] Int. Cl.$^4$ .............................................. E03C 1/02
[52] U.S. Cl. ........................................ 137/801; 4/192; 137/606
[58] Field of Search ................... 4/192; 137/359, 606, 137/801

[56] References Cited

U.S. PATENT DOCUMENTS

| 1,740,156 | 12/1929 | Crane et al. | 137/606 |
| 2,262,290 | 11/1941 | Kuhnle | 4/192 |
| 3,590,876 | 7/1971 | Young | 137/801 |
| 4,074,697 | 2/1978 | Saether | 137/801 X |
| 4,313,469 | 2/1982 | Johnson | 137/606 |

FOREIGN PATENT DOCUMENTS 615735  1/1949  United Kingdom .

Primary Examiner—Gerald A. Michalsky
Attorney, Agent, or Firm—Sheldon & Mak

[57] ABSTRACT

A mixing tap for a kitchen sink or like comprises a functional assembly of water ways in a body with control valves enclosed in a shroud for aesthetic considerations. The shroud is generally tubular with a second part and these two parts meet about an axis of the control valve normal to the axis of the spouts 22 so that a seamless smooth exterior can be provided on the spout.

12 Claims, 2 Drawing Sheets

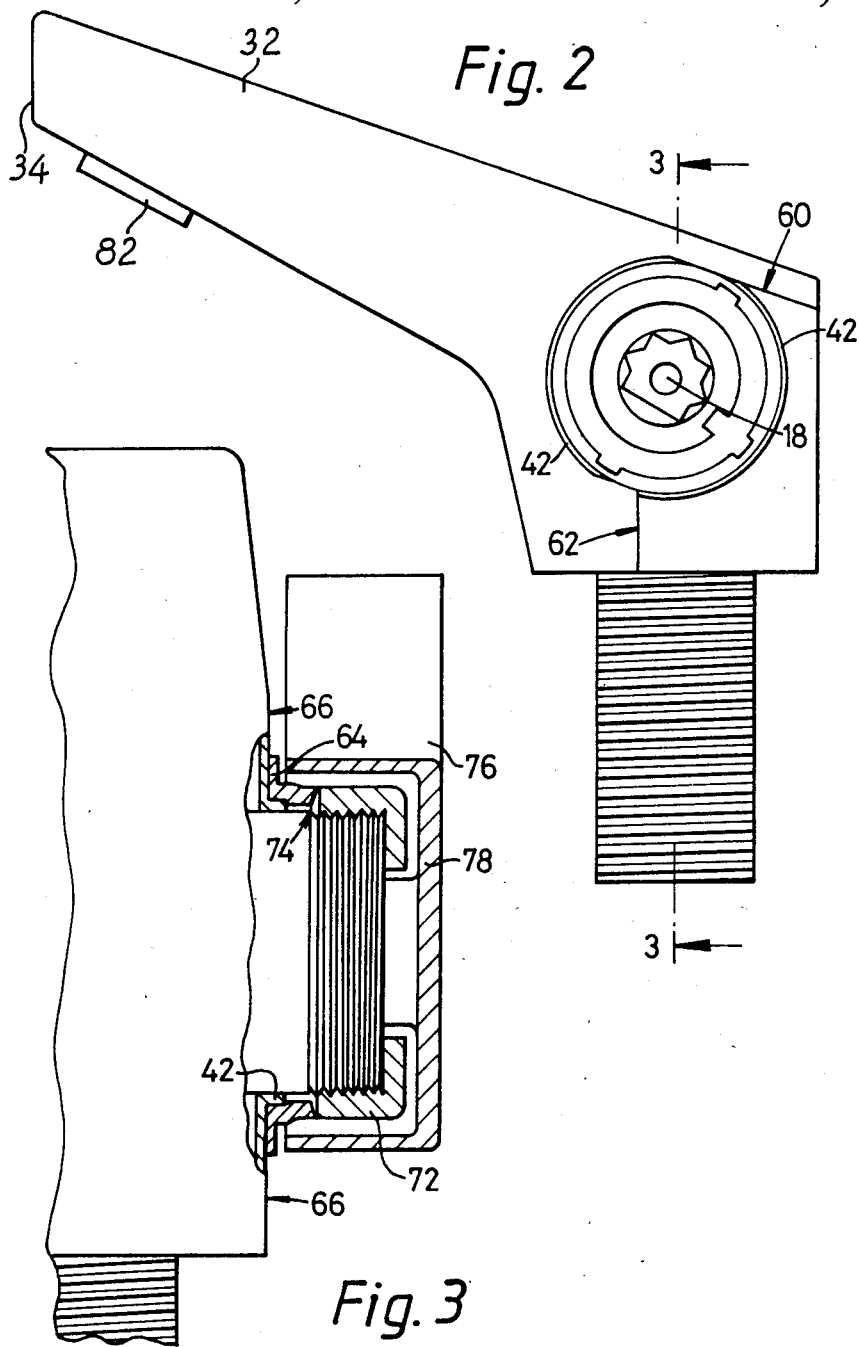

WATER SUPPLY VALVES

This invention relates to water supply valves, particularly but not exclusively to the so-called basin mixer, sink mixer or bath filler type which have separate hot and cold water supplies, individually controlled, for discharge from a common spout. Usually the passages are entirely separate through the valve in order to meet certain U.K. Water Board or other public utility regulations, so that mixing occurs in the discharged stream or in the sink, bath or basin filled from the valves.

One known manufacturing technique has employed relatively massive metal castings which provide the required waterways in their interior and an aesthetically acceptable smooth exterior surface which may be for example chromium plated. However, the interior and exterior shapes are quite different and this necessitates large volumes and weights of material which leads to an expensive valve.

A number of designs utilise functional parts which are designed independently of aesthetic restraints, and which are enclosed in an outer casing or shroud to give the desired aesthetic appearance. The difference in shapes then results in voids or air spaces between the two, which is unimportant for practical purposes.

One particular kind of mixer tap has the valve or valves controlling the separate flows located on a common axis (a first axis) for movement about that axis, and the outlet spout axis (the second axis) is generally normal to the first axis. Hitherto, the spout shroud for such a tap has been made by diecasting or injection moulding the required material (whether or not of metal) in die parts which meet in a plane containing the said spout axis, but this inevitably results in a line being visible along the length of the spout on each side, where the die parts met which calls for additional finishing operations and extra cost in order to produce a high quality finish.

The object of the invention is to solve the problem.

According to the invention a water tap having at least one control member angularly movable about a first axis and with an outlet spout extending generally along a second axis normal to the first, is characterised by the provision of a shroud for said spout, which shroud is generally tubular along the length of the second axis and is made of two separate parts which are disposed substantially on opposite sides of the said first axis.

By these means, the main shroud part which surrounds the spout can be made between a generally tubular mould cavity and an axially disposed core, which avoids the need for die parts meeting in a plane extending along the length of the spout.

Further aspects of the invention will be better understood from consideration of the following description of a presently preferred embodiment, in conjunction with the accompanying drawings:

FIG. 1 of the drawings is an exploded view of the parts of a mixer tap, with parts omitted for clarity;

FIG. 2 is a side elevation, also having parts omitted for clarity;

FIGS. 3 is a fragmentary sectional elevation taken on the line 3—3 of FIG. 2.

Figure 1:
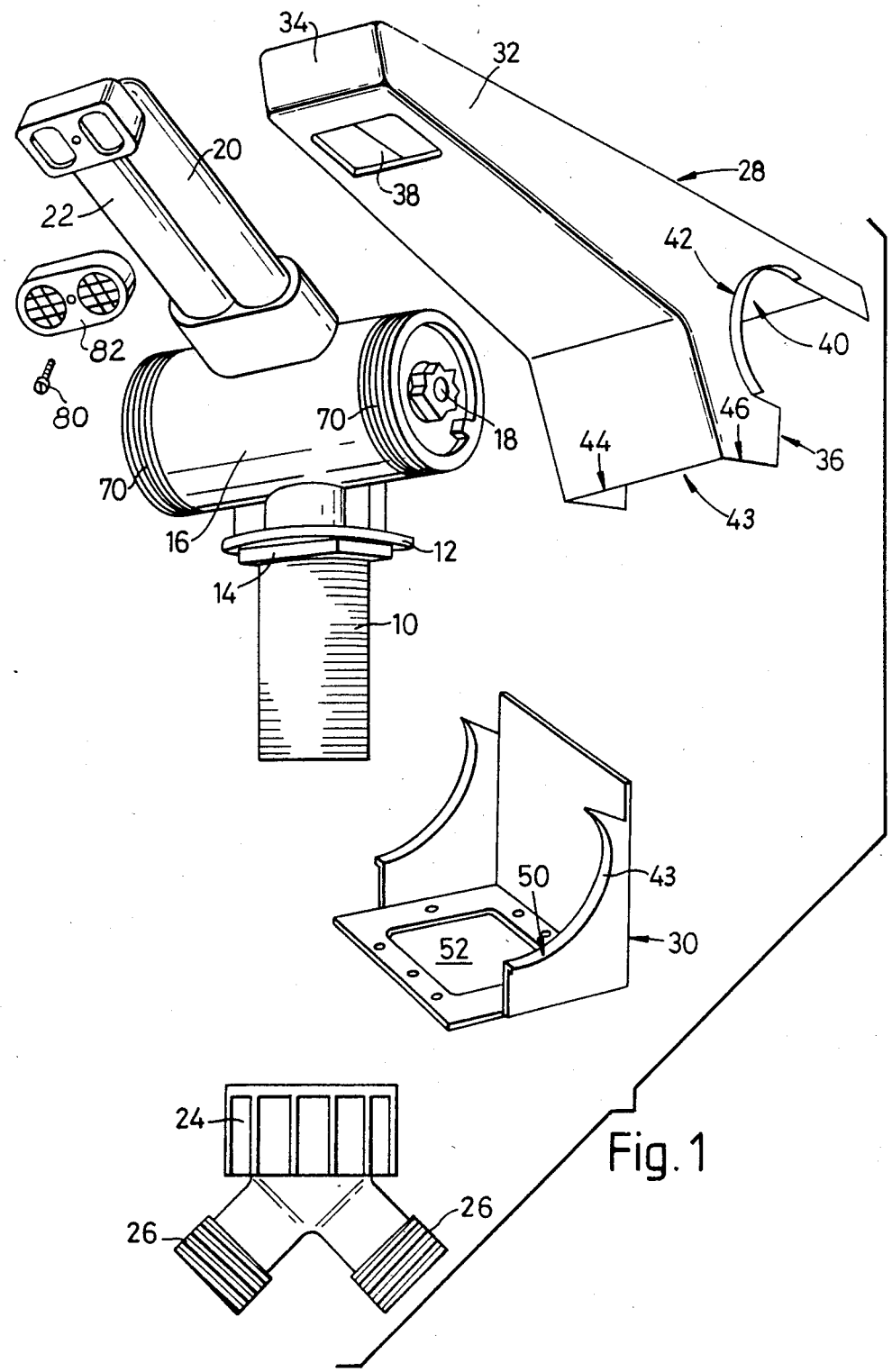

Referring to the drawings, the valve shown in Figure 1 comprises a main screw threaded tube 10 intended to be inserted through an aperture in the sink, basin or like. At the upper end of the threaded tube 10 is a fixed flange 12 having a square section boss 14 on its underface. Tube 10 is divided by an internal division to provide separate hot and cold waterways. Above the tube 10 is a main valve body 16 which is generally cylindrical about an axis which is horizontal, when the axis of the tubular part 10 is vertical. Appropriate valve control members (not shown) are provided in opposite ends of the cylindrical body parts 16 and each including a non-circular member 18 for coupling to a tap lever, not shown in FIG. 1. Each of these valve assemblies controls flow from a corresponding one of the waterways to and through a corresponding outlet tube 20 or 22 which have axes extending normally of the axis of the cylindrical parts 16 and at an obtuse angle to the axis of the part 10.

A coupling nut 24 is provided for connecting a Y piece 26 to the bottom of the tube 10 so as to connect the separate hot and cold supplier to the valve.

The cylindrical body part 16 and outlet spouts 20 22 are to be contained in a common shroud. The shroud comprises a major part 28 and a minor part 30. The part 28 in this instance is a tube of substantially rectangular cross section over the length 32 between a closed end 34 and an open end 36 but could of course be elliptical or of any other desired cross-sectional shape as dictated by style considerations. The tubular part 32 tapers from a maximum dimension at the open end 36 to a minimum dimension at the closed end 34, and a lateral port 38 allows discharge of the water through the spout.

Discharge from the spouts 20, 22 through aperture 38 may be via block 82, fixed to the spouts by a central screw 80 as the final stage of assembly. Block 82 may have an aerator or a grid-like streaming device associated with each spout and arranged to cause the issuing streams to converge.

The pen end 36 is provided with a generally semi-circular cut-out 40 at each of its parallel sides and a shallow rib 42 extends partway round the arcuate edge. The open end 36 is also open at the bottom portion 43 bounded by three generally straight edges consisting of a front edge 44 and a pair of parallel side edges 46.

The minor part of the shroud 30 also has a generally semi-circular arcuate cutout 50 on each of its side faces, and in this case a generally square aperture 52 in a base portion.

The shroud is assembled to the body part and outlet spouts as seen in FIG. 1 by passing the tubular part 10 through the square aperture 52 into the minor part 30 and engaging with the major part 28 which has bee passed over the outlet spouts 20 22. FIG. 2 shows the assembly at this point, the meeting plane of the parts being indicated by reference numerals 60 62. The ribs 42 being indicated by reference numerals 60 62. The ribs 42 then form a near continuous ring concentric with the axis of the valve parts 18.

A continuous complete ring of generally "L" cross section, 64 is then threaded on at each side of the valve, and as best seen in FIG. 3, fits closely adjacent the side face 66 of the shroud parts as well as surrounding and fitting closely against the ring parts 42.

The cylindrical body part 16 is provided with screw threads 70 at each end, and co-operating caps which are internally screw threaded, indicated by the reference numeral 72 are then screw engaged with these ends as shown in FIG. 3, for the purpose of retaining the valve assemblies in position. The rim of each cap closely abuts the ring 64 at the point 74.

The valve operating levers 76 are each integral with a further cap 78, which substantially enclose the screw threaded cap 72, being held in place by appropriate screws or like means (not shown). Fixing the block 82 to the outlet spouts 20 22, by means of screw 80, rigidly clamps the whole assembly. This completes the smooth exterior assembly providing the desired aesthetic appearance, according to the shapes imparted to the shroud parts and levers.

The shroud shapes illustrated may be made as pressure diecastings or injection mouldings of synthetic plastics materials and can be plated or otherwise finished to suit requirements.

Although the invention has been described with reference to a mixer tap, substantially the same construction can be used with a single flow tap when for example one of the levers 76 and caps 78 would be replaced by a plain cap.

We claim:

1. A water tap having at least one control member angularly movable about a first axis and with an elongate outlet spout extending generally along a second axis normal to the first, a shroud which comprises a first major part in the form of a closed end tube housing the spout and with a lateral outlet near the closed end, the other end of the major part being open and extending about the first axis, and a second and minor shroud part which is generally L-shaped and cooperates with the major part so that the two parts extend completely around the first axis, the parts being provided with rib portions concentric to the first axis, a ring surrounding the rib, and a cap enclosing the ring so as to hold the shroud parts together.

2. A tap as claimed in claim 1 including two control members on the first axis, one on each side of the tap, in which the parts are provided with rib portions, rings and caps at each side.

3. A tap as claimed in claim 1 wherein the minor L-shaped part comprises a base portion apertured for water supply passages, and a pair of arcuate side members.

4. A tap as claimed in claim 3 wherein the major part terminates in a pair of arcuate side members for cooperation with the side members of the minor part to completely enclose the first axis.

5. A tap as claimed in claim 4 wherein the encircling arcuate members are of L-shaped cross-section and are enclosed by the ring and cap.

6. A water tap having at least one control member angularly movable about a first axis and with an elongate outlet spout extending generally angularly along a second axis normal to the first, a shroud which comprises a first major part in the form of a closed end tube housing the spout and with a lateral outlet near the closed end, the other end of the major part being open and extending about the first axis, and a second and minor shroud part which is generally L-shaped and cooperates with the major part so that the two parts extend completely around the first axis including two control members on the first axis, one on each side of the tap.

7. A tap as claimed in claim 6 wherein the first part of the shroud is seamless along the housing length and extends effectively over the length of the spout.

8. A tap as claimed in claim 6 wherein the two parts of the shroud abut along a line, and including means for covering the line.

9. A tap as claimed in claim 6 including two control members on the first axis, one on each side of the tap, in which the parts are provided with rib portions, rings and caps at each side, and wherein the shroud is seamless along the housing length first part of the shroud extending effectively over the length of the spout, and wherein the two parts of the shroud abut along a line, and rings and caps for covering the line.

10. A tap as claimed in claim 6 wherein the minor L-shaped part comprises a base portion apertured for water supply passages, and a pair of arcuate side members.

11. A tap as claimed in claim 10 wherein the major part terminates in a pair of arcuate side members for cooperation with the side members of the minor part to completely enclose the first axis.

12. A tap as claimed in claim 11 wherein the encircling arcuate members are of L-shaped cross-section and are enclosed by a ring and cap.

* * * * *